United States Patent [19]

Hertel

[11] Patent Number: 5,532,690
[45] Date of Patent: Jul. 2, 1996

[54] APPARATUS AND METHOD FOR MONITORING AND BOUNDING THE PATH OF A GROUND VEHICLE

[75] Inventor: Richard J. Hertel, Fort Wayne, Ind.

[73] Assignee: ITT Corporation, New York, N.Y.

[21] Appl. No.: 416,186

[22] Filed: Apr. 4, 1995

[51] Int. Cl.⁶ .................................................. G08G 1/123
[52] U.S. Cl. ........................... 340/989; 180/167; 342/457; 364/449
[58] Field of Search .............................. 340/989; 180/167, 180/287; 342/457; 364/449

[56] References Cited

U.S. PATENT DOCUMENTS

| | | | |
|---|---|---|---|
| 4,619,231 | 10/1986 | Stolar et al. | 180/167 |
| 5,068,656 | 11/1991 | Sutherland | 340/989 |
| 5,365,451 | 11/1994 | Wang et al. | 342/457 |
| 5,442,805 | 8/1995 | Sagers et al. | 342/457 |

Primary Examiner—Glen Swann
Attorney, Agent, or Firm—Arthur L. Plevy; Patrick M. Hogan

[57] ABSTRACT

An apparatus and method for monitoring and bounding the path of a ground vehicle. The apparatus comprises a GPS receiver for receiving radio signals from a Global Positioning System which are indicative of the current ground position coordinates of the GPS receiver and thus, are the current ground position coordinates for the ground vehicle also when the GPS receiver is coupled to the vehicle. The apparatus also includes a data base for storing ground position coordinates which are indicative of at least one bounded area of permitted operation for the ground vehicle. A control unit which is responsive to the GPS receiver and the data base, is provided for comparing the stored ground position coordinates with the current ground position coordinates in order to determine if the ground vehicle is outside of the bounded area of permitted operation. A kill switch mechanism is provided for disabling the ground vehicle when the current ground position of the ground vehicle is outside of the bounded area of permitted operation.

20 Claims, 3 Drawing Sheets

APPARATUS AND METHOD FOR MONITORING AND BOUNDING THE PATH OF A GROUND VEHICLE

FIELD OF INVENTION

This invention relates generally to ground vehicles and more particularly to a method and apparatus for monitoring and bounding the path of a ground vehicle using a Global Positioning System (GPS).

BACKGROUND OF THE INVENTION

Ground vehicles such as automobiles, trucks, buses, construction equipment, motor boats, rail vehicles, etc., have intrinsic limits of travel. The travel limits of road operated ground vehicles such as automobiles, trucks, and buses which are generally defined by the vehicle's fuel or electrical capacity and/or terrain conditions. For instance, ground vehicles which run on electricity and are operated without on-board stored energy cannot go beyond the limits of their power distribution system. An example of such a vehicle is the trackless trolley bus used for public transportation.

The intrinsic travel limitations of other types of ground vehicles are more defined. For example, the travel boundaries of rail vehicles are limited to areas where there are rails.

Regardless of the type of ground vehicle, such travel limitations offer very imprecise operating boundaries for these vehicles.

In the past, efforts have been made to limit vehicle entry and operation to authorized persons using mechanical key-locks or the electronic equivalent, such as keyless entry systems and code numbers. Further, there are anti-hijack systems for trucks transporting high value cargo. These systems report the truck's location and may be driver activated if the driver is threatened. None of these systems, however, are capable of preventing authorized persons from operating the vehicle in an unauthorized location or at an unauthorized time.

Prior efforts have also been made to set travel boundaries for domestic pets and animals. Systems have been designed which enable an owner to confine a pet within the owner's yard using a collar that delivers an electrical shock to the pet if the pet leaves the yard. The boundaries of the yard can be defined in many different ways depending on the system used. Some systems use a buried electrical cable to define the boundaries of the yard. Other systems use local radio or infrared transmitter, or photoelectric cells to define the limits of the yard.

Systems have also been developed for monitoring the travel of human beings. Specifically, electronic monitoring systems are now in use for monitoring prisoners held in home detention. An electronic device attached to the prisoner communicates with a base station usually tied to the telephone system. If the base cannot communicate with the unit attached to the prisoner, the base station calls a number and sends a "prisoner has escaped message."

Previously described monitoring and bounding methods for humans and pets are not suitable for wide ranging motor vehicles, since they are too localized.

In order to precisely monitor and define the operating boundary of a ground vehicle, the present invention utilizes a Global Positioning System (GPS) and a GPS receiver.

The Global Positioning System (GPS), as exemplified by NAVSTAR/GPS, is an accurate, three-dimensional navigation system. The GPS consists of a constellation of twenty one satellites and three spares that orbit the earth twice a day at an altitude of 10,898 miles. The satellites orbit the earth in six overlapping orbital planes which are based on the equatorial plane of the earth. The orbits of the satellites enable any GPS receiver near the surface of the earth to receive signals from at least four satellites at any one time, although precise position information can be obtained with only three satellites. A GPS receiver can be located in mobile units such as aircraft or ground vehicles to enable them to precisely locate their global positions. Each satellite continuously broadcasts pseudo-random codes at L-band frequencies, L1 at 1575.42 Mhz and L2 at 1227.6 Mhz. Each satellite broadcasts a slightly different signal and each satellite broadcasts two types of signals. One of these signals is referred to as C/A code, which is a signal that can be received by civilian type GPS receivers. The other signal is referred to as P code, which is a signal that can be received only by military type GPS receivers. Ground stations on the earth receive transmissions from the satellites. These transmissions are analyzed and GPS time is compared with universal standard time at the ground stations. Corrections are transmitted to receivers in each of the satellites from the ground station. The signals which include the time the signal left the satellite, are broadcast from the satellites and decoded by the GPS receiver using triangulation techniques provided by software in the receiver to determine the location. Specifically, the interval between the transmission and the reception of the satellite signal is used to calculate the unit's distance from each of the satellites being used. Those distances are used in the algorithms to compute the receiver's position. The NAVSTAR GPS was originally designed for military use by the Department of Defense, however, it is now authorized for limited civilian use.

A major benefit of the GPS is that the number of users is unlimited because the signals transmitted by the satellites are passively acquired. Thus, broad civilian and commercial applications are possible.

GPS receivers are presently employed in automobile and truck GPS navigation systems which comprise moving map displays that aid driver navigation or provide route advice. In some applications, these systems record the path and report to a central authority, however, these systems are not capable of bounding the path of the vehicle.

It is, therefore, the primary object of the present invention to provide an apparatus and method for monitoring and bounding the path of a ground vehicle in order to prevent authorized persons from operating the vehicle in an unauthorized location or at an unauthorized time.

SUMMARY OF THE INVENTION

An apparatus and method for monitoring and bounding the path of a ground vehicle. The apparatus comprises a GPS receiver for receiving radio signals from a Global Positioning System which are indicative of the current ground position coordinates* of the GPS receiver and thus, are the current ground position coordinates for the ground vehicle also when the GPS receiver is coupled to the vehicle. The apparatus also includes a data base for storing ground position coordinates which are indicative of at least one bounded area of permitted operation for the ground vehicle. A control unit which is responsive to the GPS receiver and the data base, is provided for comparing the stored ground position coordinates with the current ground position coordinates in order to determine if the ground vehicle is outside of the bounded area of permitted operation. A kill switch mechanism is provided for disabling the ground vehicle when the current ground position of the ground vehicle is outside of the bounded area of permitted operation.

*"Ground position coordinates" as used in this patent application is a term that requires four numbers for complete specification: 3 spatial dimensions and a time. For example latitude, longitude, altitude and time. The examples described in this application do not always need the complete description of the bound is true for all times and altitudes. Nevertheless the "bound" covered by this application includes time and altitude too. "Bounded area" means bounded region of space and time.

BRIEF DESCRIPTION OF THE DRAWINGS

For a detailed understanding of the present invention, reference should be made to the following detailed description taken in conjunction with the accompanying drawings wherein.

DETAILED DESCRIPTION OF THE INVENTION

Figure 1:
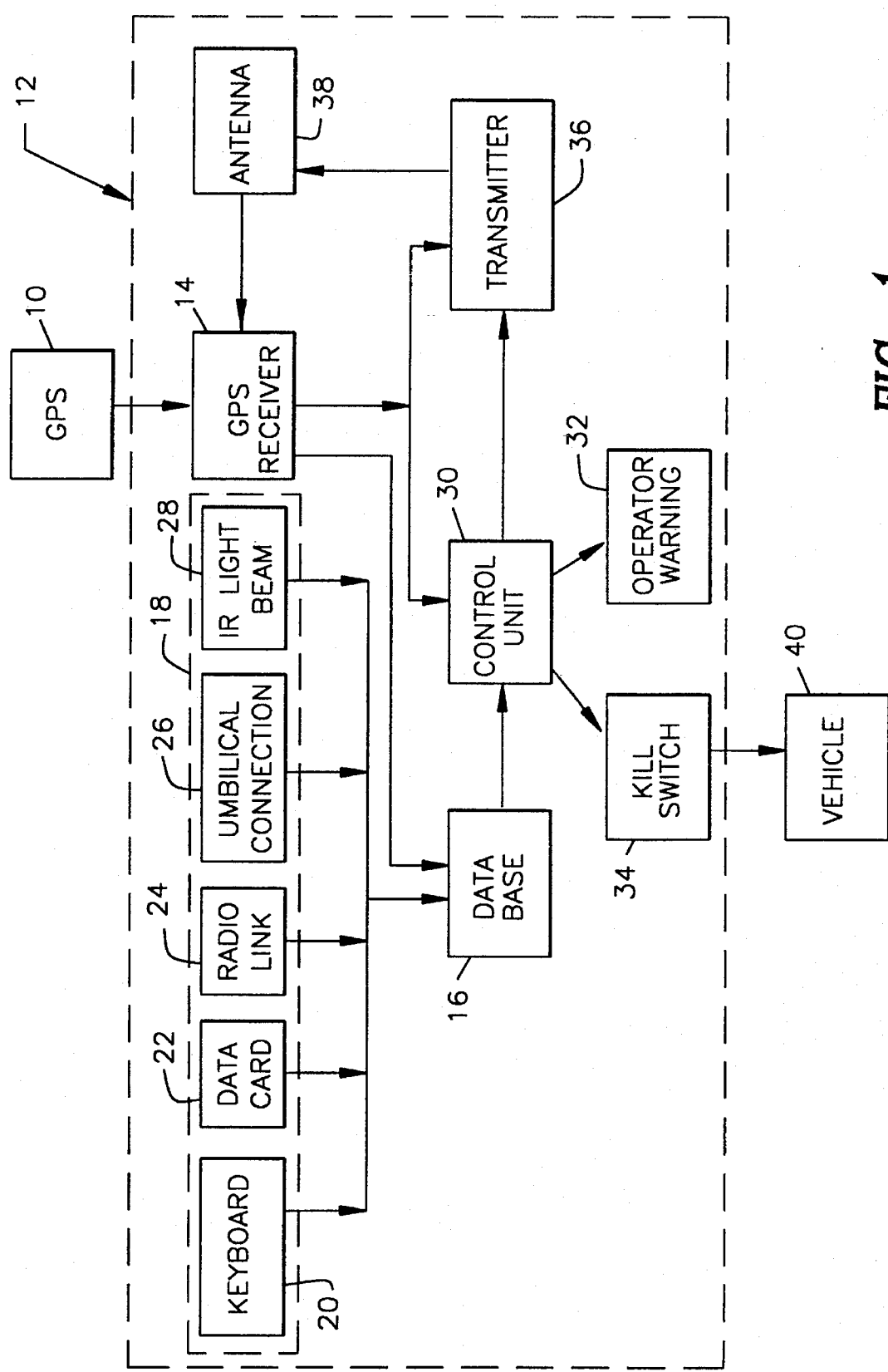
FIG. 1 is a block diagram which illustrates the functional components of the ground vehicle bounding and monitoring system of present invention.

Referring to FIG. 1 there is shown a block diagram which illustrates the functional components of the ground vehicle bounding and monitoring system 10 of present invention.

The system 12 comprises a GPS receiver 14 which converts GPS or differential GPS radio signals received from the earlier described GPS 10 into the surface coordinates of the current receiver location. Persons of ordinary skill in the art should recognize that differential GPS refers to a technique that overcomes the effects of environmental errors and Selective Availability on the GPS signals to produce a very accurate fix on the receiver's position.

In any case, the GPS receiver 14 is adapted to be installed in any type of engine or motor driven ground vehicle 40. Since the GPS receiver 14 is installed in the vehicle 40, the surface coordinates of the current receiver location are also the ground vehicle's coordinates. The GPS receiver 14 can be permanently installed in the vehicle or be portable. If the GPS receiver 14 is portable, it should be located so it can be easily accessed and removed if desired by authorized person only. Furthermore, any suitable GPS receiver hardware can be employed in the present invention.

The system 12 also includes a data base 16 for storing permitted surface coordinates in any well known manner. The data base 16 can be an integral portion of the receiver 14 or a separate component. In either case, the permitted surface coordinates can be stored as a bit-map or be used as coefficients for an algorithm that calculates the boundary of the permitted area.

The data base 16 includes data entry means 18 for loading the permitted surface coordinates into the data base 16. In one embodiment of the invention, the data entry means is provided by the GPS receiver as the vehicle moves along a permitted route. In this embodiment, the receiver operates in a learning mode to learn the permitted surface coordinates as the vehicle moves along the permitted route. In another embodiment of the present invention, the data entry means is provided by a keyboard which is coupled to the data base.

The keyboard enables the user to type the permitted surface coordinates into the data base. It is also contemplated that the data entry means can take the form of some type of data card such as a magnetic stripe or smart card or ROM card the operation of which will be explained later. Further, any other type of well known data entry mechanism can be used including a radio link, a temporary umbilical connection and/or an infrared light beam. In the preferred embodiment shown in FIG. 1, the data entry means includes many of the techniques described above including a keyboard 20, a data card 22, a radio link 24, means for accepting an umbilical connection 26, and IR light beam 28 capability. It should be understood, however, that any combination of data entry means could be included in a working embodiment of the present invention.

A control unit 30 is also provided in the system 12 of the present invention. The control unit 30 can be an integral part of the receiver 14 of a separate component. The control unit 30, in either case, is coupled to the outputs of both the GPS receiver 14 and the data base 16. The control unit 30 includes software and/or hardware that operates to compare the current surface coordinates generated by the GPS receiver 14 with the permitted surface coordinates stored in the data base 16 as will be explained later in greater detail. In the preferred embodiment shown in FIG. 1, the control unit 30 is coupled to operator warning means 32 which can form a portion of the receiver 14, a separate component or be portion of the vehicle 40. Regardless of the form it takes, the operator warning means 32 can comprise a warning light, a warning buzzer, or an audible and/or visible warning, all of which are intended to warn the operator that he or she has strayed from the permitted route and that the vehicle is about to be disabled.

The output of the control unit 30 is coupled to a kill switch 34 which operates to disable the vehicle 40 by shutting down the vehicle's engine or motor. The kill switch 40 can be coupled to either the electrical circuits of the vehicle or the electro-mechanical components that selectively control the operation of the vehicle's ignition and fuel system. The controlled deactivation of such circuits and components by a kill switch is well known in the automobile anti-theft art.

The system of the present invention can optionally include a transmitter 36 and is included in the preferred embodiment shown in FIG. 1. The transmitter 36 of the present invention is adapted to send the vehicle's surface coordinates to either internal or external storage. The transmitter 36 can be summoned to send the vehicle's coordinates either continuously as received from the GPS receiver 14 or only upon the control unit 30 producing a "fail-to-match condition".

The system 12 of the present invention further comprises an antenna 38 which is coupled to the receiver 14. The antenna 38 enables the system 12 to receive and transmit radio signals. Such antennas are well known in the art of GPS receivers.

The system 12 of the present invention, operates to continuously compare the vehicle's current ground location with a permitted vehicle location data stored in the on-board data base 16. If the two location values do not agree, the kill switch 34 disables the vehicle's engine or motor.

Since the system 12 of the present invention operates in conjunction with the GPS 10, the present invention has global coverage. Additionally, a vehicle equipped with the present invention does not have to use roads or tracks for the invention to function.

According to the present invention, a permitted position may consist of an area as small as a ten meter radius about the current vehicle position. On the other extreme, permitted positions can be as large as the whole earth but more usefully, they can be selected states, counties, highways, and military reservations and/or warehouses. The permitted positions may consist of a series of coordinates along a given path which extends between a starting point and an ending point. Such a path may be as narrow as ten meters.

A permitted position may be limited by time. This insures that the vehicle arrives or leaves a given position within a predetermined time limit.

In all the scenarios described above, the penalty for failure to remain within a permitted area is engine/motor shut-down and in some applications, transmission of the final position by the optional transmitter 36.

Figure 2:
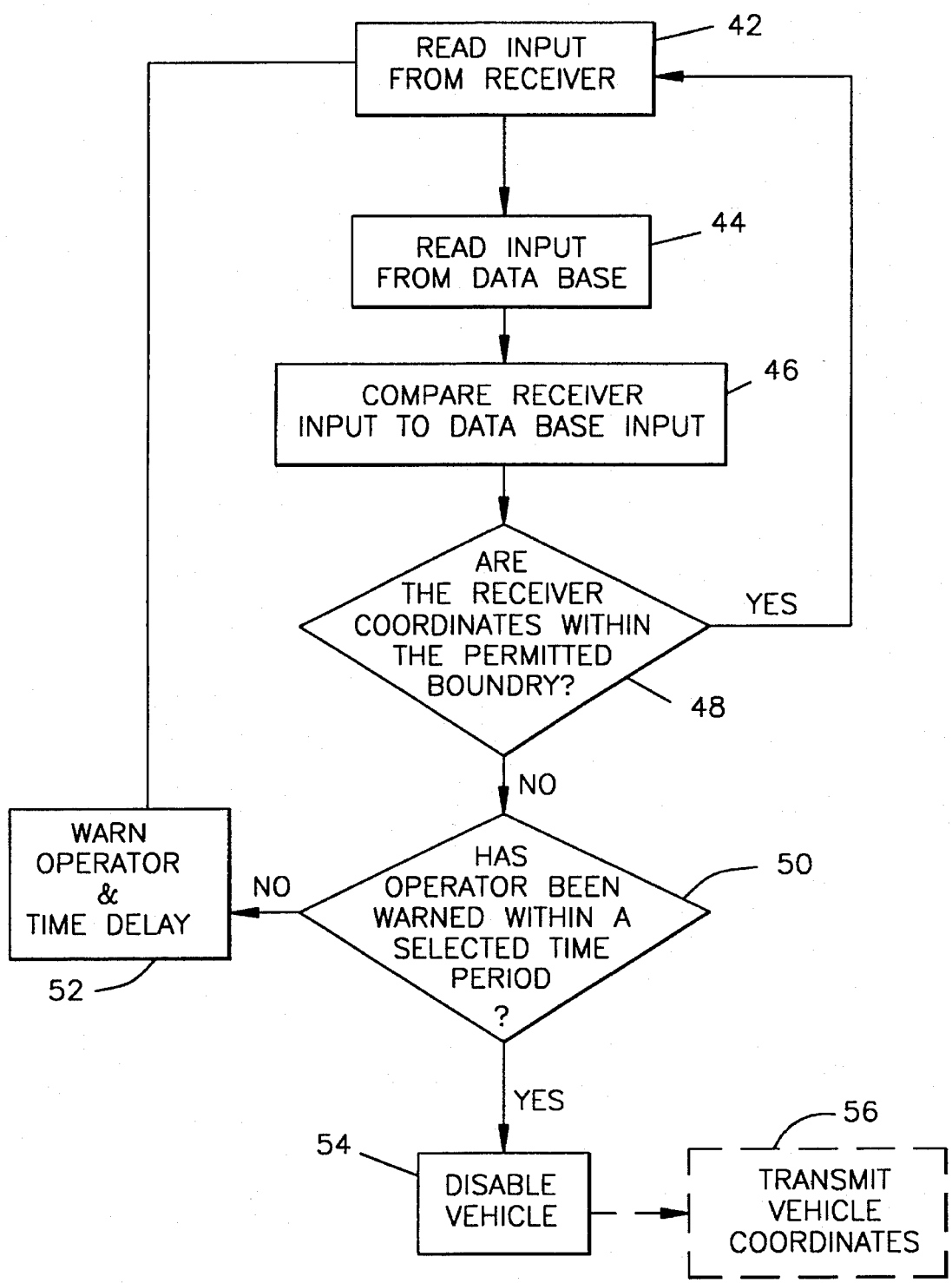
FIG. 2 is a flow chart which illustrates the operation of the control unit of present invention.

Referring now to FIG. 2 a flow chart is shown which illustrates the operation of the control unit 30 of present invention. The operation of the control unit can be implemented using primarily software, although portions may be implemented by well known hardware components. Starting at the top of the flow chart with first step 42 that the control unit reads the receiver's current surface coordinates and box 44 indicates that the control unit reads the permitted surface coordinates stored in the data base. In the next step 46, the control unit compares both sets of coordinates to determine if the current surface coordinates match the permitted surface coordinates. In step 48, if both sets of coordinates match, the control unit repeats steps 42–46 with an updated set of current surface coordinates. However, if the current surface coordinates fail to match the permitted surface coordinates, the control unit then performs step 50 which involves determining whether the operator of the vehicle has been warned that the vehicle is about to be disabled within a selected time period. This selected time period is approximately equal to the duration of the time delay which will be described shortly. If no warning has been issued within the selected time period, the next step perform by the control unit involve sending a signal to the vehicle warning means which includes a time delay feature as shown in box 52. The duration of the time delay can vary depending upon the application. For example, the time delay can be long enough to allow the operator to return the vehicle to the permitted area. In another example, the time delay will only be long enough to allow the operator to remove the vehicle from the road. In any case, once the time delay has elapsed, the process of steps 42–50 repeats itself. If the current receiver coordinates remain outside of the permitted boundary and the operator has been warned within a selected time period, the control unit performs step 54 which is to send a signal to the kill switch mechanism to disable the vehicle. Once the vehicle has been disabled, the control unit sends the final location coordinates of the disabled vehicle to either internal or external storage via the transmitter as shown in step 56.

Figure 3:
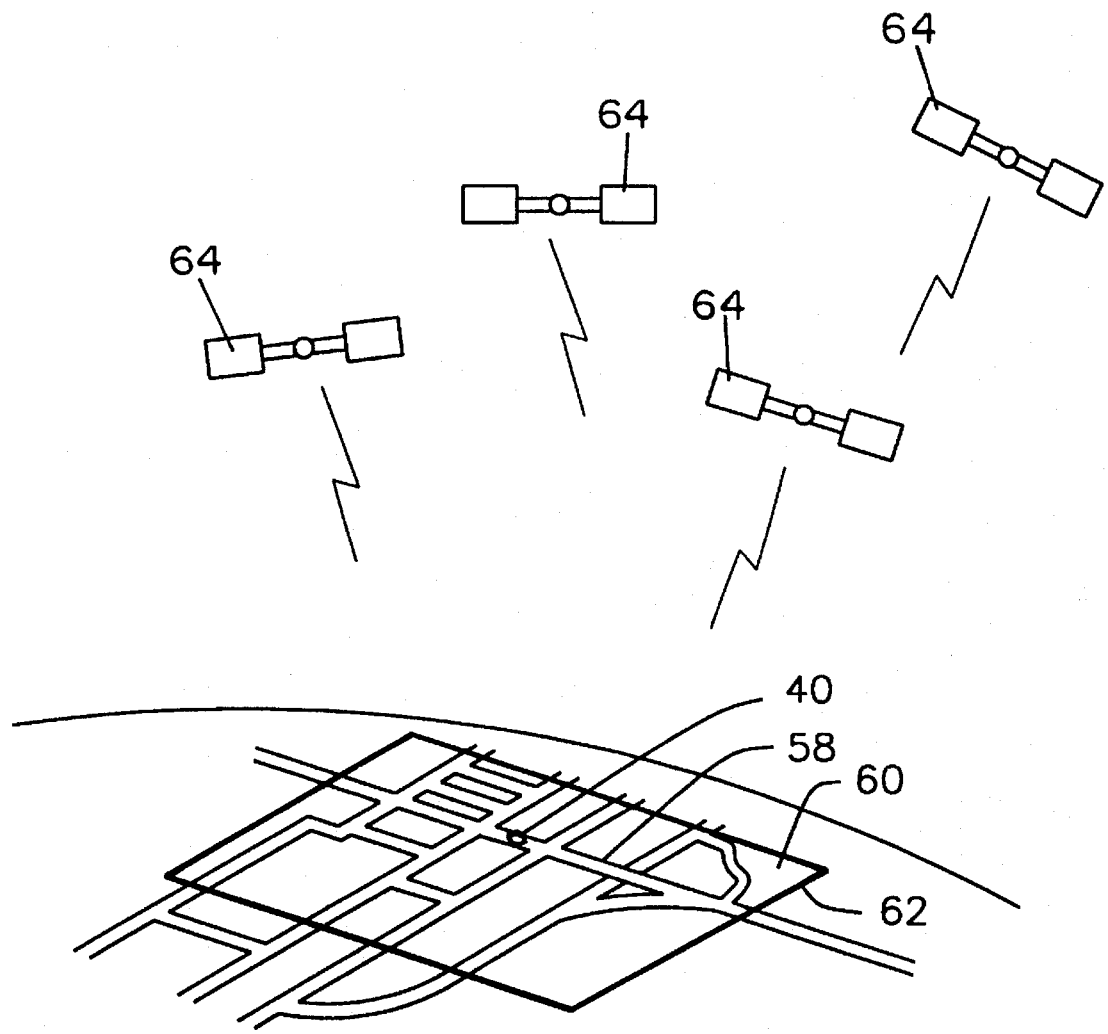
FIG. 3 shows a schematic diagram of a ground vehicle monitored in accordance with the present invention.

As one of ordinary skill will ascertain, the present invention has many possible applications. One potential application is in the area of vehicle theft prevention. In such an application, the authorized operator of the vehicle would have a password which disables the system. The data base would be loaded with permitted surface coordinates that would not allow the vehicle to operate outside of a very small region. The region might be the commute route to and from work and home as shown in FIG. 3. FIG. 3 shows a vehicle 40 traveling on a commute route 58 which is monitored by the GPS satellites 64. If the vehicle 40 is operated outside of the permitted region 60 shown bounded by boundary 62 imposed by the system of the present invention, the system would transmit such operation to a central monitoring station operated either privately or by the local police.

Another potential application is in the area of cargo monitoring. Dangerous cargo or heavy cargo transported by a truck, often have restricted routes through populated areas. The route may also have certain time restrictions. The hauling license for such routes often specify these limits. Accordingly, the data entry means of the present invention could take the form of a ROM card. Actual route and time restrictions would be written to the card as the cargo truck travels along its route thereby documenting the route and travel times actually followed. The kill switch in such an application would operate as "real-time" enforcement. The current route information could be transmitted from the vehicle to an approaching gateway. If the current route information is not authorized, the gateway would operate to prohibit passage of the truck therethrough.

Still another application of the present invention involves facility security. In this application, the present invention could be implemented to allow a vehicle to travel freely about some areas of a military reservation while preventing the vehicle from accessing other restricted areas of the reservation. This could be accomplished in the present invention by issuing each potential operator of the vehicle with a ROM card individually tailored for each the respective operator with the appropriate clearances to enter different areas. Thus, one operator might be cleared to use the vehicle for the entire base while a different operator with a different card would be cleared to use the same vehicle in only selected areas.

Further, the military reservation could also be a warehouse where the vehicle would comprise a fork-lift truck. In such an application, the shipping documents for the goods to be stored in the warehouse would include a ROM card with locator information for the stored goods, the route, and the area and the route that the fork-lift is permitted to travel written thereto.

The present invention can also be used in toll road and bridge billing applications. In such applications, the data entry means would comprise a pre-purchased card which would operate to grant a predetermined number of uses of a particular route and at a time dependent cost.

It should be understood that the embodiments described herein are merely exemplary and that a person skilled in the art may make many variations and modifications to these embodiments utilizing functionally equivalent elements to those described herein. Any and all such variations or modifications as well as others which may become apparent to those skilled in the art, are intended to be included within the scope of the invention as defined by the appended claims.

What is claimed is:

1. An apparatus for monitoring and bounding the path of a ground vehicle, comprising:

GPS receiver means for receiving radio signals from a Global Positioning System which are indicative of the current ground position of said GPS receiver means, whereby said current ground position is also the ground vehicle's current ground position when said GPS receiver means is coupled thereto;

data base means for storing data which is indicative of at least one bounded area of permitted operation for the ground vehicle;

computing means responsive to said GPS receiver means and said data base means, for determining if the current ground position is outside of said at least one bounded area of permitted operation; and kill switch means responsive to said computing means for disabling the ground vehicle when the current ground position is outside of said at least one bounded area of permitted operation.

2. The apparatus according to claim 1, further comprising transmitter means responsive to said computing means for transmitting the current ground position of said GPS receiver means to a ground vehicle monitoring area.

3. The apparatus according to claim 2, wherein said transmitter means transmits the current ground position continuously.

4. The apparatus according to claim 2, wherein said transmitter means transmits the current ground position when the current ground position is outside of said at least one bounded area of permitted operation.

5. The apparatus according to claim 1, wherein said data base means includes data entry means for loading data which is indicative of said at least one bounded area of permitted operation into said data base means.

6. The apparatus according to claim 5, wherein said data entry means includes learning mode means associated with said GPS receiver means for enabling said GPS receiver means to operate as a source for said data as the ground vehicle moves along within said at least one bounded area of permitted operation.

7. The apparatus according to claim 5, wherein said data entry means includes keyboard means for entering said data into said data base means.

8. The apparatus according to claim 5, wherein said data entry means includes data card means for entering said data into said data base means.

9. The apparatus according to claim 5, wherein said data entry means includes radio link means for entering said data into said data base means.

10. The apparatus according to claim 5, wherein said data entry means includes umbilical connection means for entering said data into said data base means.

11. The apparatus according to claim 5, wherein said data entry means includes infrared light means for entering said data into said data base means.

12. The apparatus according to claim 1, wherein said data base means includes a bit map of permitted ground position coordinates which are indicative of said at least one bounded area of permitted operation for the ground vehicle.

13. The apparatus according to claim 1, wherein said data base means includes an algorithm that calculates said at least one bounded area of permitted operation for the ground vehicle.

14. The apparatus according to claim 1, wherein said kill switch means includes means for warning an operator of the ground vehicle, that said ground vehicle is being disabled.

15. A method for monitoring and bounding the path of a ground vehicle using a Global Positioning System, comprising the steps of:

locating the current ground position of said ground vehicle using radio signals transmitted by said Global Positioning System which are received by GPS receiver means associated with said ground vehicle, whereby said transmitted radio signals are indicative of the current ground position of said ground vehicle;

determining whether the current ground position of said ground vehicle is outside of a predetermined bounded area of permitted operation; and disabling said ground vehicle when the current ground position is outside of said predetermined bounded area of permitted operation.

16. The method according to claim 15, further comprising the step of transmitting the current ground position of said ground vehicle to a ground vehicle monitoring area.

17. The method according claim 15, wherein said step of determining whether the current ground position of said ground vehicle is outside of a predetermined bounded area of permitted operation includes the steps of:

storing said predetermined bounded area of permitted operation in data base means; and comparing the current ground position of said ground vehicle to said predetermined bounded area of permitted operation stored in said data base means.

18. The method according to claim 17, wherein said step of storing includes entering said predetermined bounded area of permitted operation in said data base means using data entry means.

19. The method according to claim 15, further comprising the step of warning an operator of said ground vehicle that said ground vehicle is about to be disabled before said step of disabling.

20. An apparatus for monitoring and bounding the path of a ground vehicle, comprising:

a GPS receiver for receiving radio signals from a Global Positioning System which are indicative of the current ground position coordinates of said GPS receiver, whereby said current ground position coordinates are also the ground vehicle's current ground position coordinates when said GPS receiver is coupled thereto;

data base means for storing ground position coordinates which are indicative of at least one bounded area of permitted operation for the ground vehicle;

computing means responsive to said GPS receiver and said data base means, which compares said stored ground position coordinates with the current ground position coordinates in order to determine if the ground vehicle is outside of said at least one bounded area of permitted operation; and kill switch means responsive to said computing means for disabling the ground vehicle when the current ground position of the ground vehicle is outside of said at least one bounded area of permitted operation.

* * * * *